Aug. 26, 1930.   J. F. DAUKUS   1,774,254
CLUTCH MECHANISM
Filed June 28, 1927
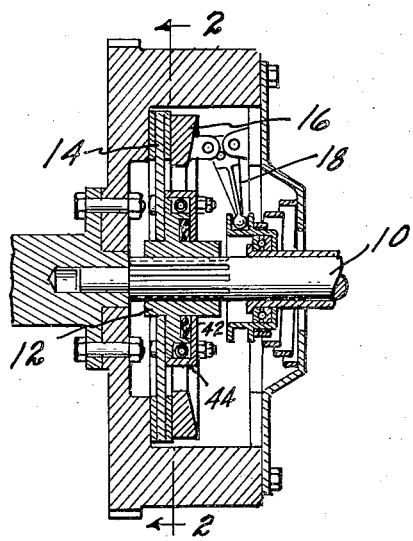
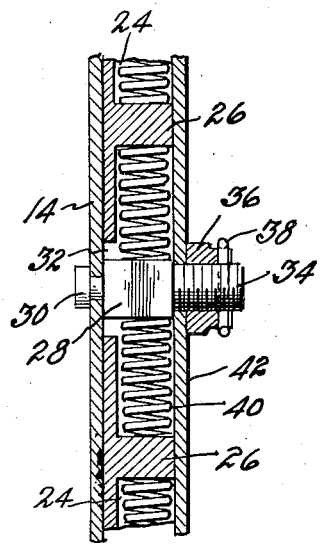
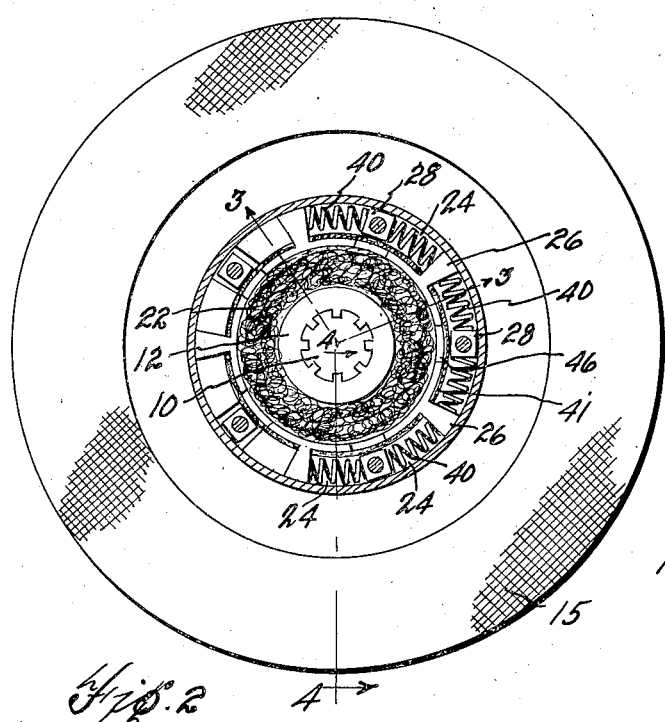
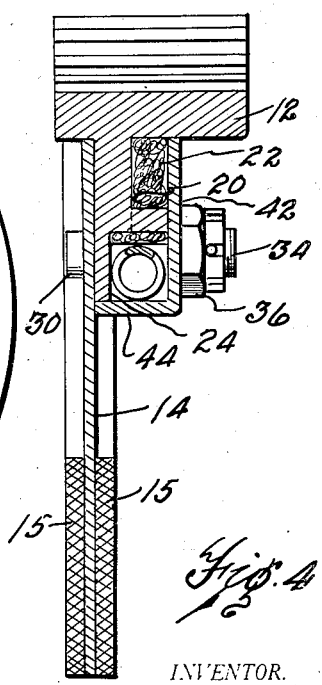
INVENTOR.
John F. Daukus,
BY Parker & Burton
ATTORNEYS.

Patented Aug. 26, 1930

1,774,254

UNITED STATES PATENT OFFICE

JOHN F. DAUKUS, OF DETROIT, MICHIGAN

CLUTCH MECHANISM

Application filed June 28, 1927. Serial No. 201,984.

My invention relates to improved clutch mechanism such as is commonly employed in coupling the internal combustion engine of a motor vehicle to the driving wheels of such vehicle.

The object is to provide a clutch so constructed that the engagement of the cooperating clutch members may be effected without that objectionable jar or shock which frequently results from the sudden, positive interconnection of the clutch members.

More specifically the object of my invention is to provide one clutch member of such a character that the shock of engagement of such member with its cooperative clutch member is absorbed and cushioned and the connection is smoothly and easily accomplished without subjecting the cooperating clutch parts to undue and unnecessary strain.

Other objects and advantages of my improved structure will more fully appear from the following description, accompanying drawing and appended claims.

In the drawings:

Fig. 1 is a vertical sectional view through a clutch embodying my invention.

Fig. 2 is a sectional view taken on line 2—2 of Fig. 1 omitting the fly wheel flange.

Fig. 3 is a fragmentary sectional view taken on line 3—3 of Fig. 2.

Fig. 4 is a sectional view taken on line 4—4 of Fig. 2.

My improvement is illustrated in a clutch structure of otherwise conventional type wherein there is a rotatable shaft 10 carrying a hub 12, which hub carries a clutch plate 14 that is adapted to cooperate with a second clutch member 16 which is actuated through suitable mechanism of a well known type such as a spring controlled toggle lever connection indicated generally as 18. My invention resides in the structure embodied in the hub 12 and clutch plate 14.

The clutch plate 14 is so mounted upon the hub 12 that the interconnection between the plate and the hub absorbs the shock consequent upon the coupling of the clutch member. The hub is here shown as splined upon the shaft 10 to rotate with the shaft. Upon one face of the hub there is formed an annular recess 20 which may be filled with an absorbent lubricant filler 22. Upon the same face of the hub there is formed a shoulder or a series of arcuate recesses 24 which is or are open to the periphery of the hub. These arcuate recesses are separated by fixed abutments or lugs 26.

The clutch plate 14 may be provided with suitable clutch facings 15 and it is placed in juxtaposition to the opposite side of the hub, as appears in Figs. 1 and 2. This clutch plate is provided with a series of lugs 28 riveted thereto as at 30. These lugs are disposed within oversize openings 32 which permit limited rotation of the plate with respect to the hub. The outer end of the lug is reduced in size and threaded as at 34 and a nut 36 and spring lock 38 is here shown as carried thereon.

Suitable springs 40 are mounted within the recesses 24 between the abutments 26 and the lugs 28 to yieldingly resist the rotatable movement of the plate 14 with respect to the hub. An annular cover plate 42 extends over the face of the hub inclosing the recesses 20 and 24 and is held in place by the nuts 36. This ring has a marginal flange 44 which encircles the hub and holds the springs 40 in place.

The filler 22 contains a suitable lubricant and openings 46 are provided which lead to recesses 24 so that lubricant may pass to suitable filler pads 41 which are placed within said recesses adjacent to the springs 40.

It will be seen that upon the coupling of the clutch members together the initial jar or shock of this interconnection will be absorbed by the springs 40 but that the permitted rotatable movement of the clutch plate 14 with respect to the hub is limited by engagement of lugs 28 with the periphery of openings 32. As a result, the operation of my improved clutch structure is unusually smooth and flexible and it is not accompanied by that undesirable jar which otherwise would at times result.

What I claim is:

1. Clutch mechanism comprising, in combination, a rotatable shaft, a hub on the shaft provided upon said side with a series of circumferentially spaced apart arcuate peripheral recesses separated by abutments said hub provided with openings extending transversely therethrough into said arcuate recesses between said abutments and also provided on the same side as the recesses with a concentric groove spaced inwardly radially from said arcuate recesses and separated therefrom by a rib, a clutch plate mounted upon the shaft adjacent that side of the hub opposite said groove and recesses and provided with lugs extending through the openings in the hub into said recesses between said abutments, springs arranged in said arcuate recesses between the lugs of the clutch plate and the abutments of the hub, a lubricant absorbent ring arranged within said groove, lubricant passageways leading from the groove into the recesses and a cover plate mounted upon the lugs of the clutch plate adjacent that side of the hub opposite the clutch plate and provided with a peripheral flange encircling the hub and holding the springs within the recesses thereof.

2. Clutch mechanism comprising, in combination, a hub provided with a plurality of circumferentially spaced apart arcuate peripheral recesses separated by abutments, a clutch plate arranged upon one side of the hub and provided with lugs extending therethrough into the recesses thereof between said abutments, springs arranged within said recesses between the lugs of the clutch plate and the abutments of the hub, said hub provided with an annular lubricant retaining groove arranged inwardly radially of the arcuate recesses and separated therefrom by a wall provided with lubricant passageway leading therefrom into each arcuate recess upon opposite sides of the lug therein, a cover plate upon that side of the hub opposite the clutch plate over said lubricant retaining groove and the arcuate recesses and encircling the periphery of the hub.

3. Clutch mechanism comprising, in combination, a hub member, cushion pads seated within said hub member, a driven disk member, springs seated upon said pads connecting the disk member therewith to be rotated thereby while permitting limited relative rotatable displacement of said members and interengaged rigid parts on the disk and hub adapted to take the driving torque off the springs upon a predetermined compression of said springs.

4. Clutch mechanism comprising, in combination, a rotatable driving member, a rotatable driven member coupled therewith for rotation through means comprising rigid abutments carried by one of said members arranged in spaced apart annular relationship and extending axially through oversize openings in the other member, said other member being provided with said oversize openings through which said abutments extend, cushion pads extending between said abutments and springs seated against said pads and yieldingly connecting said members to rotate as one piece adapted to permit relative rotatable displacement of said members limited by said abutments engaging within said oversize openings to take the rotatable thrust from said springs.

5. Clutch mechanism comprising, in combination, a rotatable driving member, a rotatable driven member coupled therewith for rotation through means comprising rigid abutments carried by one of said members arranged in spaced apart annular relationship and extending axially through oversize openings in the other member, said other member being provided with said oversize openings through which said abutments extend, cushion pads extending between said abutments and springs seated against said pads and yieldingly connecting said members to rotate as one piece comprising a pair of springs for each abutment arranged one upon one side of the abutment and the other upon the opposite side of the abutment, each spring engaging with said other member to yieldingly resist while permitting within the limit of permitted movement of said abutments within said oversize openings the rotatable displacement of said members.

6. Clutch mechanism comprising, in combination, a rotatable driving member, a rotatable driven member coupled therewith for rotation through means comprising rigid abutments carried by one of said members arranged in spaced apart annular relationship and extending axially through oversize openings in the other member, said other member being provided with said oversize openings through which said abutments extend, and springs yieldingly connecting said members to rotate as one piece and a cup-shaped washer enclosing said springs and mounted upon said abutments to be carried for rotation by said driven member.

7. Clutch mechanism comprising, in combination, a rotatable driving member, a rotatable driven member coupled therewith for rotation through means comprising rigid abutments carried by one of said members arranged in spaced apart annular relationship and extending axially through oversize openings in the other member, said other member being provided with said oversize openings through which said abutments extend, and springs yieldingly connecting said members to rotate as one piece and a cup-shaped washer enclosing said springs and mounted upon said abutments to be carried for rotation by said driven member, one of said members being provided with a lubricant recess arranged in concentric relationship with respect to the springs and enclosed within said cup-shaped washer.

8. Clutch mechanism comprising, in combination, a hub member, a driven disc member including abutments overlapping a portion of said hub, spaced apart annular recesses within said hub member provided with a cushion in each recess, means for lubricating said cushions, springs seated within said recesses upon the abutments for connecting the disc member with the hub member to be rotated thereby while permitting limited relatively rotatable displacement of the members, and rigid connections carried by the disc member and extending through oversized openings in the hub member for absorbing the rotatable thrust of said members upon determined relative displacement, thereby coupling said members together for rotation as a unit.

9. Clutch mechanism comprising, in combination, a hub member, a driven disc member, spaced apart annular recesses within said hub member, a cushion pad within each of said recesses, springs seated upon said pads and connecting the disc member with the hub member to be rotated thereby while permitting limited relatively rotatable displacement of the members, and rigid connections between the hub member and the disc member determining the limit of said relative displacement.

10. Clutch mechanism comprising, in combination, a driving member, a driven member, a lubricant positioned between adjacent faces of said driving and driven members whereby friction therebetween during relative movement thereof is substantially eliminated, springs connecting the driven member with said driving member to be rotated thereby while permitting limited relative rotatable displacement of said members, and interengaged rigid parts on the driving and driven members adapted to take the driving torque off the springs upon a predetermined compression thereof.

11. Clutch mechanism comprising, in combination, a driving member, a driven member, a lubricant supported substantially by said driving member and contacting adjacent faces of said driving and driven members, springs connecting the driven member with said driving member to be rotated thereby while permitting limited relative rotatable displacement of said members, and interengaged rigid parts on the driving and driven members adapted to take the driving torque off the springs upon a predetermined compression thereof.

In testimony whereof, I, John F. Daukus, sign this specification.

JOHN F. DAUKUS.